(12) United States Patent
Browne et al.

(10) Patent No.: US 10,341,264 B2
(45) Date of Patent: Jul. 2, 2019

(54) TECHNOLOGIES FOR SCALABLE PACKET RECEPTION AND TRANSMISSION

(71) Applicant: Intel Corporation, Santa Clara, CA (US)

(72) Inventors: John J. Browne, Limerick (IE); Tomasz Kantecki, Ennis (IE); Chris MacNamara, Limerick (IE); Pierre Laurent, Quin (IE); Sean Harte, Limerick (IE)

(73) Assignee: Intel Corporation, Santa Clara, CA (US)

( * ) Notice: Subject to any disclaimer, the term of this patent is extended or adjusted under 35 U.S.C. 154(b) by 214 days.

(21) Appl. No.: 15/199,110

(22) Filed: Jun. 30, 2016

(65) Prior Publication Data

US 2018/0006970 A1    Jan. 4, 2018

(51) Int. Cl.
*H04L 12/879* (2013.01)
*H04L 12/43* (2006.01)
*H04L 12/927* (2013.01)
*H04L 12/935* (2013.01)
*H04L 12/861* (2013.01)

(52) U.S. Cl.
CPC ............ *H04L 49/901* (2013.01); *H04L 12/43* (2013.01); *H04L 47/803* (2013.01); *H04L 49/3063* (2013.01); *H04L 49/9042* (2013.01)

(58) Field of Classification Search
CPC ............. G06F 13/28; G06F 9/544; G06F 2009/45583; G06F 9/45558; H04L 41/0213; H04L 47/10; H04L 49/901; H04L 49/9047; H04L 69/04; H04L 49/3036; H04L 49/3063; H04L 49/9021
See application file for complete search history.

(56) References Cited

U.S. PATENT DOCUMENTS

2006/0174251 A1* 8/2006 Pope ................. H04L 49/90
                                                        719/318
2015/0172193 A1* 6/2015 Sinha ................ H04L 47/12
                                                        370/230

* cited by examiner

*Primary Examiner* — Yemane Mesfin
*Assistant Examiner* — Mon Cheri S Davenport
(74) *Attorney, Agent, or Firm* — Barnes & Thornburg LLP

(57) ABSTRACT

Technologies for scalable packet reception and transmission include a network device. The network device is to establish a ring that is defined as a circular buffer and includes a plurality of slots to store entries representative of packets. The network device is also to generate and assign receive descriptors to the slots in the ring. Each receive descriptor includes a pointer to a corresponding memory buffer to store packet data. The network device is further to determine whether the NIC has received one or more packets and copy, with direct memory access (DMA) and in response to a determination that the NIC has received one or more packets, packet data of the received one or more packets from the NIC to the memory buffers associated with the receive descriptors assigned to the slots in the ring.

26 Claims, 11 Drawing Sheets

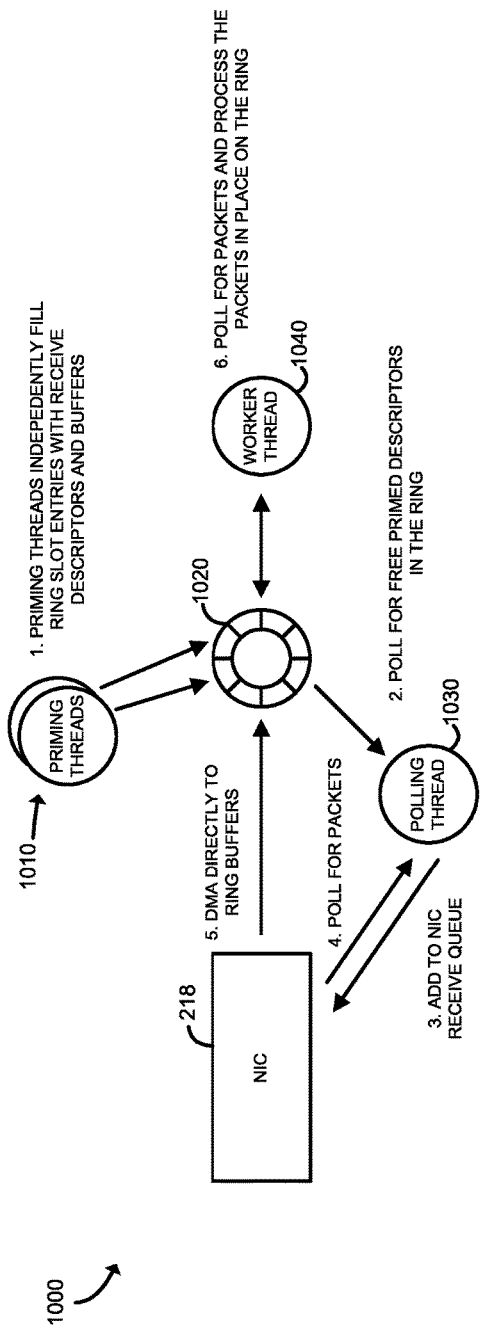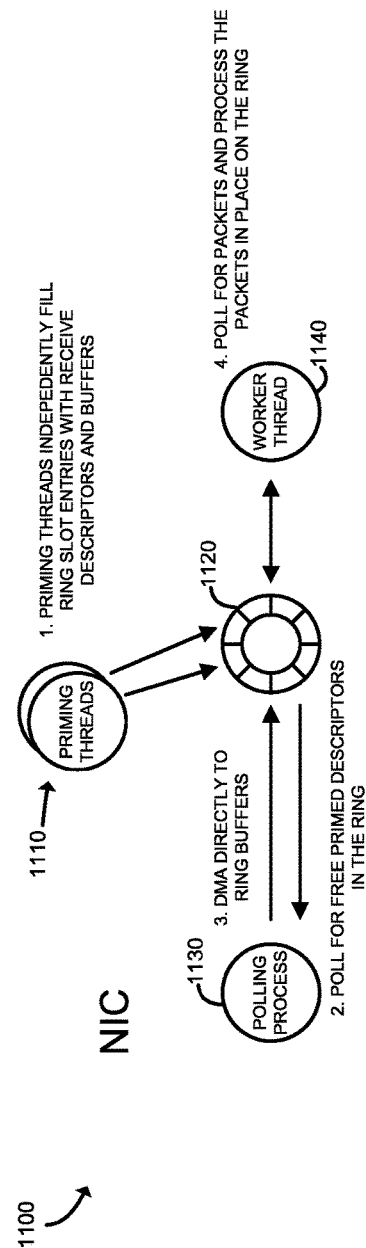

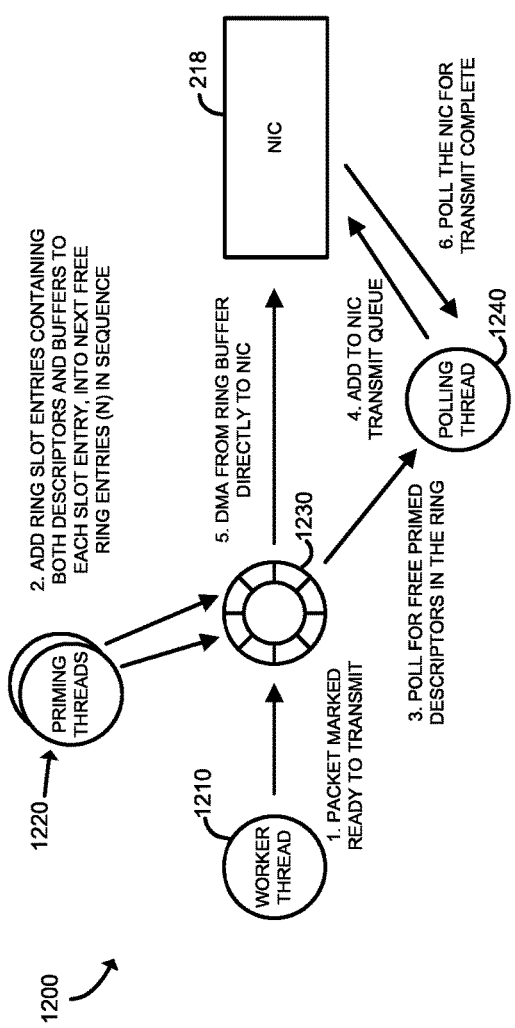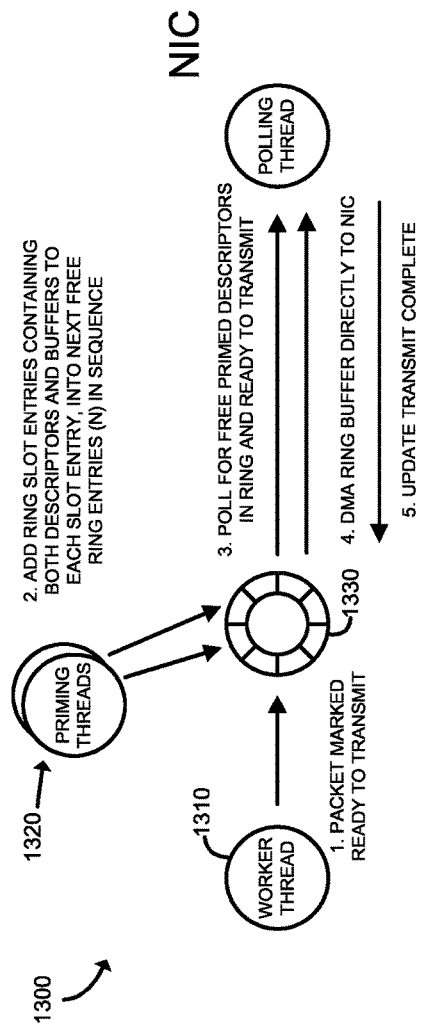

… (1)

TECHNOLOGIES FOR SCALABLE PACKET RECEPTION AND TRANSMISSION

BACKGROUND

In typical systems, all packet pointers received from a network interface card are taken by a thread executing on a core of a processor from a receive descriptor location and placed into a queue for processing by an application. This process creates a bottleneck on a core and prevents scalability when throughput exceeds the capacity of the single core to move the receive data pointers into the application queue. Additionally, in typical systems, a bottleneck also exists in the transmission of packets, as a single core executes a thread to execute a similar process to move data from an application queue to a network interface card for transmission.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 10 is a simplified diagram of processes performed by components within the network device of FIGS. 1 and 2 in at least one embodiment of a method for receiving data packets;

FIG. 11 is a simplified diagram of processes performed by components within the network device of FIGS. 1 and 2 in at least another embodiment of a method for receiving data packets;

FIG. 12 is a simplified diagram of processes performed by components within the network device of FIGS. 1 and 2 in at least one embodiment of a method for outputting data packets; and FIG. 13 is a simplified diagram of processes performed by components within the network device of FIGS. 1 and 2 in at least another embodiment of a method for outputting data packets.

DETAILED DESCRIPTION OF THE DRAWINGS

Figure 1:
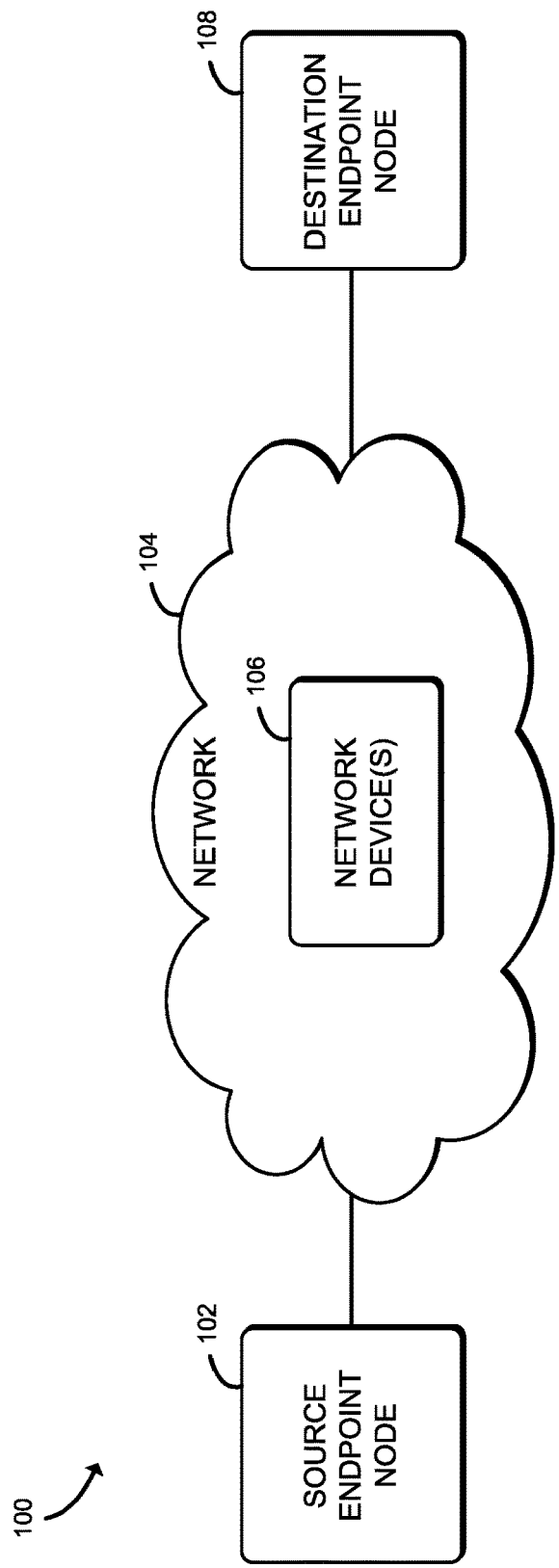
FIG. 1 is a simplified block diagram of at least one embodiment of a system that includes a network device for providing scalable packet reception and transmission.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for providing scalable packet reception and transmission includes a source endpoint node 102 and a destination endpoint node 108 in communication over a network 104 via one or more network devices 106. In use, the network device 106 facilitates the transmission of network packets (e.g., based on workload type, flow information, etc.) between the source endpoint node 102 and the destination endpoint node 108 over the network 104. As described in more detail herein, the illustrative network device 106 utilizes a shared ring (i.e., a circular buffer) in memory and allocates cores of one or more processors of the network device 106 to various stages of a processing pipeline. In the illustrative embodiment, the stages include one or more input stages, one or more worker stages, and one or more output stages. The input stages perform a priming process in which the input stages allocate buffers in main memory for storage of packet data and generate receive descriptors. Each receive descriptor includes an instruction to receive a packet and a pointer to the buffer for storage of the packet data. The input stages then add these receive descriptors as entries to slots of the shared ring sequentially. Further, the input stages may perform a polling process to provide these receive descriptors from the ring to a network interface controller (NIC), which may also be referred to as a host fabric interface (HFI). The NIC then stores the data from received packets into the buffers using direct memory access (DMA).

The worker stages perform operations ("worker functions") on the received packet data, such as compression, decompression, encryption, decryption, firewall services, and/or other functions and update metadata associated with the corresponding entries in the slots of the ring to indicate a completion status of each worker stage. Further, the output stages generate transmit descriptors and add them to the slots in the ring sequentially. The transmit descriptors are similar to the receive descriptors in that they include an instruction to the NIC (i.e., an instruction to transmit a packet) and a pointer to a memory buffer that includes the packet data to be transmitted. When the metadata of an entry in a slot indicates that the worker stages have finished processing the packet data and that the packet data is ready to be transmitted, the output stage copies the packet data to the NIC using DMA. It should be appreciated that, in the illustrative embodiment, the input and output stages fill the slots in the ring with receive descriptors and transmit descriptors at a rate that is independent of the rate at which packets are actually received and/or transmitted by the NIC, thereby reducing the bottleneck present in typical systems. In other words, a supply of receive descriptors and transmit descriptors, and the associated memory buffers, are made available before the NIC utilizes them. Further, as described in more detail herein, in some embodiments, to provide further efficiencies, operations of the input and output stages are implemented by hardware components of the NIC itself, rather than by software threads executed on cores of the processor.

The source endpoint node 102 may be embodied as any type of computation or computing device capable of performing the functions described herein, including, without limitation, a computer, a desktop computer, a smartphone, a workstation, a laptop computer, a notebook computer, a tablet computer, a mobile computing device, a wearable computing device, a network appliance, a web appliance, a distributed computing system, a processor-based system, and/or a consumer electronic device. Similarly, the destination endpoint node 108 may be embodied as any type of computation or computing device capable of performing the functions described herein, including, without limitation, a computer, a desktop computer, a smartphone, a workstation, a laptop computer, a notebook computer, a tablet computer, a mobile computing device, a wearable computing device, a network appliance, a web appliance, a distributed computing system, a processor-based system, and/or a consumer electronic device. Each of the source endpoint node 102 and the destination endpoint node 108 may include components commonly found in a computing device such as a processor, memory, input/output subsystem, data storage, communication circuitry, etc.

The network 104 may be embodied as any type of wired or wireless communication network, including cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), telephony networks, local area networks (LANs) or wide area networks (WANs), global networks (e.g., the Internet), or any combination thereof. Additionally, the network 104 may include any number of network devices 106 as needed to facilitate communication between the source endpoint node 102 and the destination endpoint node 108.

Figure 2:
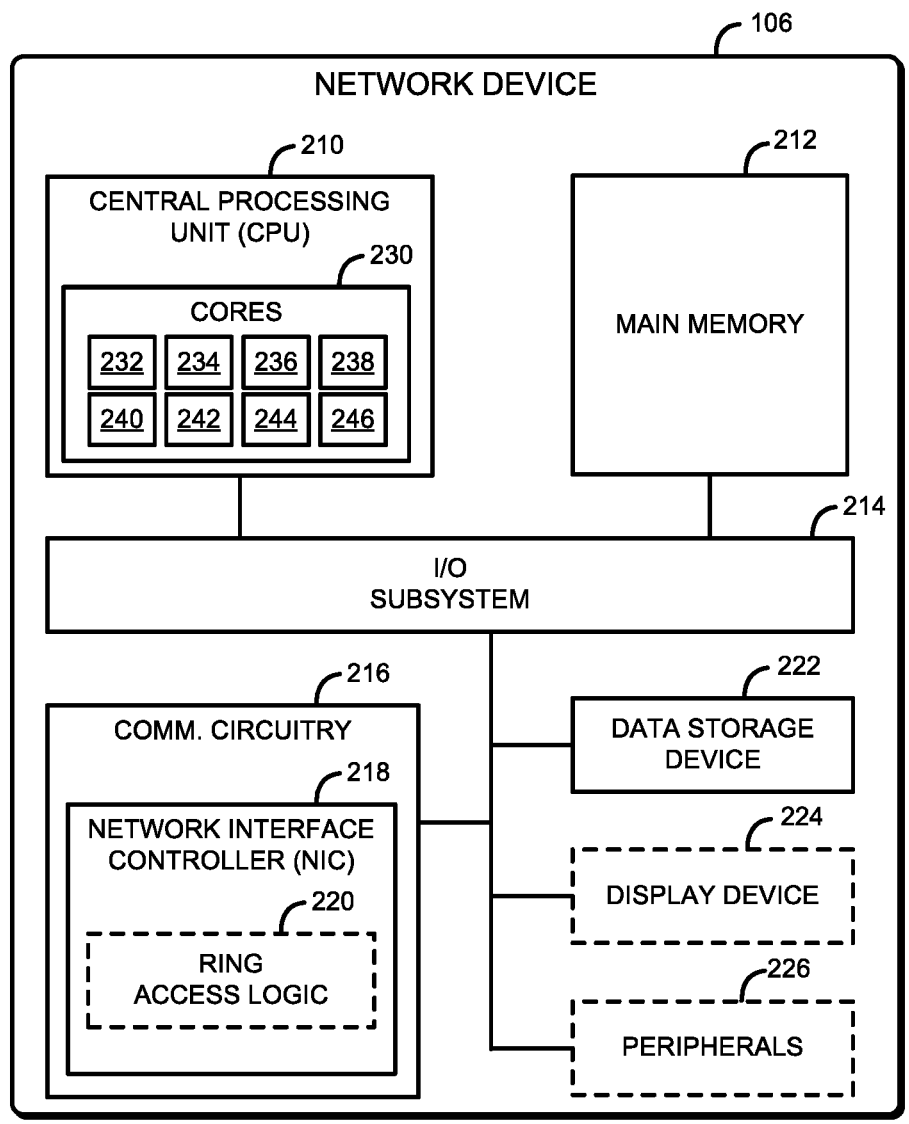
FIG. 2 is a simplified block diagram of at least one embodiment of a network device of the system of FIG. 1.

Each network device 106 may be embodied as any type of computing device capable of facilitating wired and/or wireless network communications between the source endpoint node 102 and the destination endpoint node 108. For example, the network devices 106 may be embodied as a server (e.g., stand-alone, rack-mounted, blade, etc.), a router, a switch, a network hub, an access point, a storage device, a compute device, a multiprocessor system, a network appliance (e.g., physical or virtual), a computer, a desktop computer, a smartphone, a workstation, a laptop computer, a notebook computer, a tablet computer, a mobile computing device, or any other computing device capable of processing network packets. As shown in FIG. 2, an illustrative network device 106 includes a central processing unit (CPU) 210, a main memory 212, an input/output (I/O) subsystem 214, and communication circuitry 216. Of course, in other embodiments, the network device 106 may include other or additional components, such as those commonly found in a computer (e.g., data storage, display, etc.). Additionally, in some embodiments, one or more of the illustrative components may be incorporated in, or otherwise form a portion of, another component. For example, in some embodiments, the main memory 212, or portions thereof, may be incorporated in the CPU 210.

The CPU 210 may be embodied as any type of processor capable of performing the functions described herein. The CPU 210 may be embodied as a single or multi-core processor(s), a microcontroller, or other processor or processing/controlling circuit. In some embodiments, the CPU 210 may be embodied as, include, or be coupled to a field programmable gate array (FPGA), an application specific integrated circuit (ASIC), a graphics processing unit (GPU), reconfigurable hardware or hardware circuitry, or other specialized hardware to facilitate performance of the functions described herein. In the illustrative embodiment, the CPU 210 is embodied as a processor containing a set 230 of multiple cores 232, 234, 236, 238, 240, 242, 244, and 246. While eight cores are shown in FIG. 2, it should be understood that in other embodiments, the CPU 210 may contain a different number of cores. Similarly, the main memory 212 may be embodied as any type of volatile (e.g., dynamic random access memory (DRAM), etc.) or non-volatile memory or data storage capable of performing the functions described herein. In some embodiments, all or a portion of the main memory 212 may be integrated into the CPU 210. In operation, the main memory 212 may store various data and software used during operation of the network device 106 such as ring data, packet data, stage data, NIC queue data, operating systems, applications, programs, libraries, and drivers.

The I/O subsystem 214 may be embodied as circuitry and/or components to facilitate input/output operations with the CPU 210, the main memory 212, and other components of the network device 106. For example, the I/O subsystem 214 may be embodied as, or otherwise include, memory controller hubs, input/output control hubs, integrated sensor hubs, firmware devices, communication links (i.e., point-to-point links, bus links, wires, cables, light guides, printed circuit board traces, etc.), and/or other components and subsystems to facilitate the input/output operations. In some embodiments, the I/O subsystem 214 may form a portion of a system-on-a-chip (SoC) and be incorporated, along with one or more of the CPU 210, the main memory 212, and other components of the network device 106, on a single integrated circuit chip.

The communication circuitry 216 may be embodied as any communication circuit, device, or collection thereof, capable of enabling communications over the network 104 between the network device 106 and the source endpoint node 102, another network device 106, and/or the destination endpoint node 108. The communication circuitry 216 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 216 includes a network interface controller (NIC) 218, which may also be referred to as a host fabric interface (HFI). The NIC 218 may be embodied as one or more add-in-boards, daughtercards, network interface cards, controller chips, chipsets, or other devices that may be used by the network device 106 to connect the source endpoint node 102, the destination endpoint node 108, and/or another network device 106. In some embodiments, the NIC 218 may be embodied as part of a system-on-a-chip (SoC) that includes one or more processors, or included on a multichip package that also contains one or more processors. In some embodiments, the NIC 218 may include a local processor (not shown) and/or a local memory (not shown) that are both local to the NIC 218. In such embodiments, the local processor of the NIC 218 may be capable of performing one or more of the functions of the CPU 210 described herein. Additionally or alternatively, in such embodiments, the local memory of the NIC 218 may be integrated into one or more components of the network device 106 at the board level, socket level, chip level, and/or other levels. Further, the NIC 218 may include ring access logic 220, which may be embodied as a processor, a microcontroller, an FPGA, an ASIC or any other device capable of enabling the NIC 218 to directly access receive descriptors and transmit descriptors stored in slots of the shared ring, rather than relying on software threads executed by one or more of the cores 230 of the CPU 210 to independently copy these descriptors to separate queues for the NIC 218. The ring access logic 220 enables the NIC 218 to access the non-contiguously stored receive descriptors and transmit descriptors in the ring rather than relying on the cores of the CPU 210 to separately copy the receive descriptors and the transmit descriptors to separate queues for the NIC 218 where those descriptors are stored contiguously.

The network device 106 may additionally include a data storage device 222, which may be embodied as any type of device or devices configured for short-term or long-term storage of data such as, for example, memory devices and circuits, memory cards, hard disk drives, solid-state drives, or other data storage devices. The data storage device 222 may include a system partition that stores data and firmware code for the network device 106. The data storage device 222 may also include an operating system partition that stores data files and executables for an operating system of the network device 106.

Additionally, the network device 106 may include a display 224. The display 224 may be embodied as, or otherwise use, any suitable display technology including, for example, a liquid crystal display (LCD), a light emitting diode (LED) display, a cathode ray tube (CRT) display, a plasma display, and/or other display usable in a compute device. The display may include a touchscreen sensor that uses any suitable touchscreen input technology to detect the user's tactile selection of information displayed on the display including, but not limited to, resistive touchscreen sensors, capacitive touchscreen sensors, surface acoustic wave (SAW) touchscreen sensors, infrared touchscreen sensors, optical imaging touchscreen sensors, acoustic touchscreen sensors, and/or other type of touchscreen sensors. Additionally or alternatively, the network device 106 may include one or more peripheral devices 226. Such peripheral devices 226 may include any type of peripheral device commonly found in a compute device such as speakers, a mouse, a keyboard, and/or other input/output devices, interface devices, and/or other peripheral devices.

Figure 3:
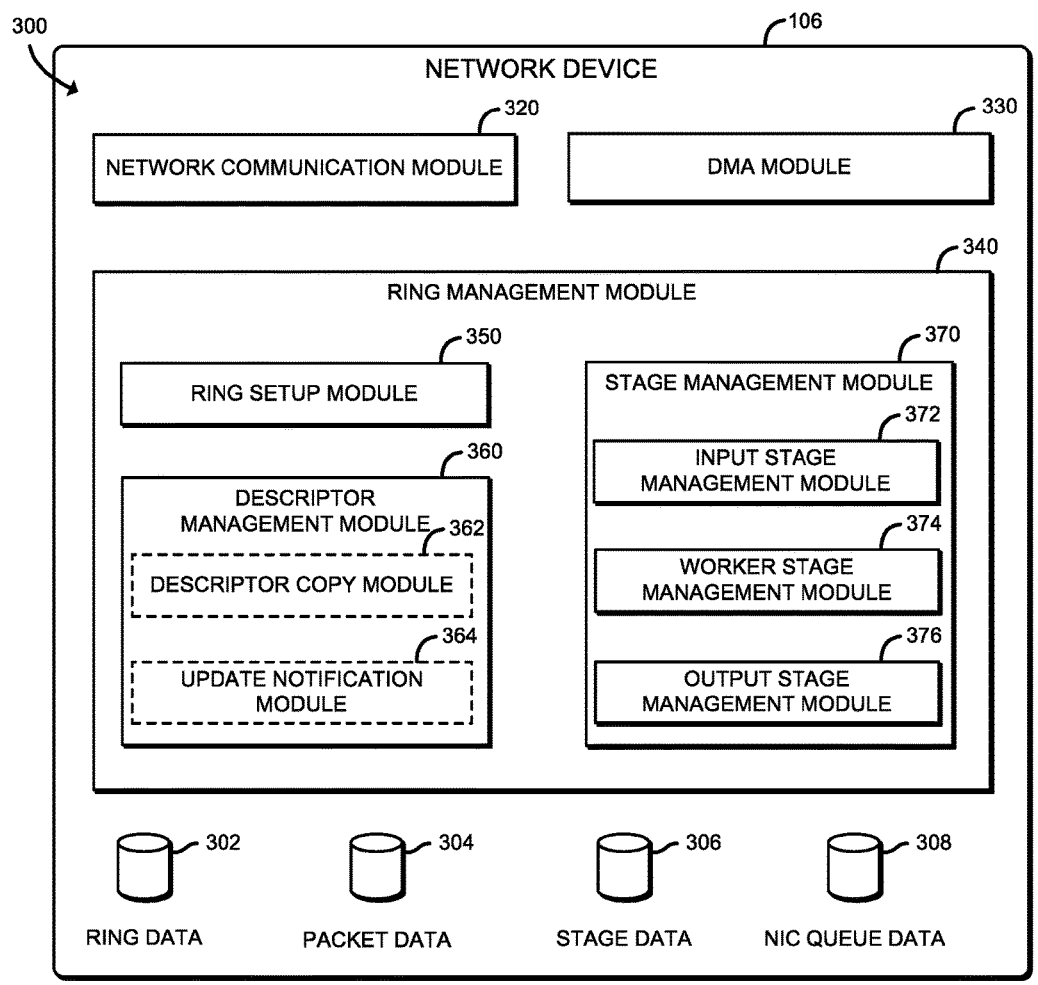
FIG. 3 is a simplified block diagram of at least one embodiment of an environment that may be established by the network device of FIGS. 1 and 2.

Referring now to FIG. 3, in the illustrative embodiment, each network device 106 may establish an environment 300 during operation. The illustrative environment 300 includes a network communication module 320, a DMA module 330, and a ring management module 340 that includes a ring setup module 350, a descriptor management module 360, and a stage management module 370. Each of the modules, logic, and other components of the environment 300 may be embodied as hardware, firmware, software, or a combination thereof. As such, in some embodiments, one or more of the modules of the environment 300 may be embodied as circuitry or collection of electrical devices (e.g., network communication circuitry 320, DMA circuitry 330, ring management circuitry 340, ring setup circuitry 350, descriptor management circuitry 360, stage management circuitry 370, etc.). It should be appreciated that, in such embodiments, one or more of the network communication circuitry 320, DMA circuitry 330, ring management circuitry 340, ring setup circuitry 350, descriptor management circuitry 360, or stage management circuitry 370 may form a portion of one or more of the CPU 210, communication circuitry 216, main memory 212, I/O subsystem 214, and/or other components of the network device 106. Additionally, in some embodiments, one or more of the illustrative modules may form a portion of another module and/or one or more of the illustrative modules may be independent of one another. Further, in some embodiments, one or more of the modules of the environment 300 may be embodied as virtualized hardware components or emulated architecture, which may be established and maintained by the CPU 210 or other components of the network device 106.

In the illustrative environment 300, the network device 106 also includes ring data 302, packet data 304, stage data 306, and NIC queue data 308. The ring data 302 represents a ring established in the memory 212 and includes a set of entries. As discussed in more detail below in regard to FIG. 8, each entry is associated with a sequence number (i.e., a slot number) and includes a pointer to the data of a packet and metadata pertaining to the packet. The metadata defines properties of the data packet, such as the packet size, an input port number, an output port number, and state data that indicates which stages have completed processing of the data packet and whether the data packet is ready for transmission to another device (e.g., to the destination endpoint node 108). Each entry also includes a receive descriptor that includes a pointer to the packet data and a transmit descriptor that also includes a pointer to the packet data. The packet data 304, in the illustrative embodiment, is embodied as the contents of the data packets received and operated on by the various stages assigned to the cores 230. As such, the packet data 304 may include headers, payload data, and/or other information initially included in a data packet and/or information added to or modified in the data packet as a result of processing by the stages. The stage data 306, in the illustrative embodiment, includes information used to manage the status of the various stages executed by the cores 230 in the network device 106. As such, the stage data 306 includes a present sequence number (i.e., the index of the present entry in the ring that a given stage is operating on) of each stage and a stage instance identifier, which may be used to distinguish between separate instances of the same stage. The NIC queue data 308 includes a receive queue, which stores a contiguous set of receive descriptors from the ring, for packets that are to be received, and a transmit queue, which stores a contiguous set of transmit descriptors from the ring for packets that are ready to be transmitted out of the network device. The ring data 302, packet data 304, stage data 306, and NIC queue data 308 may be accessed by the various modules and/or sub-modules of the network device 106. It should be appreciated that the network device 106 may include other components, sub-components, modules, sub-modules, and/or devices commonly found in a network device, which are not illustrated in FIG. 3 for clarity of the description.

The network communication module 320, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the network device 106, respectively. To do so, the network communication module 320 is configured to receive and process data packets from one computing device (e.g., the source endpoint node 102, another network device 106, the destination endpoint node 108) and to prepare and send data packets to another computing device (e.g., the source endpoint node 102, another network device 106, the destination endpoint node 108). Accordingly, in some embodiments, at least a portion of the functionality of the network communication module 320 may be performed by the communication circuitry 216, and, in the illustrative embodiment, by the NIC 218. The DMA module 330, which may be embodied as hardware, firmware, software, virtualized hardware, emulated architecture, and/or a combination thereof as discussed above, is configured to enable packet data to be copied, using direct memory access (DMA) between the NIC 218 and the memory buffers specified in the pointers in the descriptors included in the slots of the shared ring.

The ring management module 340, which may be embodied as hardware, firmware, software, virtualized hardware, emulated architecture, and/or a combination thereof as discussed above, is configured to establish the ring in the memory 212 of the network device 106, assign the cores 230 of the CPU 210 to the stages, including one or more input stages, one or more output stages, and various worker stages, and manage concurrent access of the stages to entries in the ring. To do so, in the illustrative embodiment, the ring management module 340 includes the ring setup module 350, the descriptor management module 360, and the stage management module 370. The ring setup module 350, in the illustrative embodiment, is configured to allocate a section of memory and establish a ring buffer (referred to herein as simply a "ring") in the memory. In the illustrative embodiment, the ring is organized into a series of slots, each of which may contain an entry that includes metadata, a receive descriptor, and a transmit descriptor, as described above. The slots and, by association, the entries stored therein, have sequence numbers. As described in more detail herein, a process such as a stage may cycle through the entries in the ring by incrementing its own internal sequence number and applying a modulus function to the internal sequence number based on the size (i.e., number of slots) of the ring, such that the resulting sequence number falls into the range of 0 to the size of the ring minus one. In the illustrative embodiment, the ring setup module 350 is configured to establish a ring having a size that is a power of two, which enables the use of masking to convert from a sequence number of a stage to an index (i.e., slot number) into the ring.

The descriptor management module 360, which may be embodied as hardware, firmware, software, virtualized hardware, emulated architecture, and/or a combination thereof as discussed above, is configured to manage the generation of receive descriptors and transmit descriptors for use by the NIC 218. To do so, the descriptor management module 360 may include a descriptor copy module 362 and an update notification module 364. The descriptor copy module 362 may be configured to copy generated receive descriptors and transmit descriptors to corresponding queues for the NIC 218. The update notification module 364 may be configured to provide an update to the NIC 218 that a new receive descriptor or transmit descriptor has been added to the corresponding queue of the NIC 218, such as by updating a tail register associated with the NIC 218. As described herein, in other embodiments, the NIC 218 may be configured to directly access the non-contiguously stored descriptors in the shared ring, rather than relying on a separate process to copy those descriptors to the queues of the NIC 218. It should be appreciated that each of the descriptor copy module 362 and the update notification module 364 may be separately embodied as hardware, firmware, software, virtualized hardware, emulated architecture, and/or a combination thereof. For example, the descriptor copy module 362 may be embodied as a hardware component, while the update notification module 364 is embodied as virtualized hardware components or as some other combination of hardware, firmware, software, virtualized hardware, emulated architecture, and/or a combination thereof.

The stage management module 370, which may be embodied as hardware, firmware, software, virtualized hardware, emulated architecture, and/or a combination thereof as discussed above, is configured to assign stages to the cores 230 of the CPU 210, and/or to the NIC 218, and manage their access to the entries in the ring. To do so, the illustrative stage management module includes an input stage management module 372, a worker stage management module 374, and an output stage management module 376. The input stage management module 372, in the illustrative embodiment, is configured to assign one or more cores 230, or the NIC 218, to one or more input stages, and use the assigned component to prime (i.e., fill) available entries in the ring with receive descriptors, receive packets with the communication circuitry 216, such as the NIC 218, add the received packet data to the buffers associated with the receive descriptors for each entry in the ring, and add or update metadata for each entry in the ring indicating that the data is ready to be processed by one or more worker stages. The worker stage management module 374, in the illustrative embodiment, is configured to assign and/or reassign cores 230 to worker stages to identify entries in the ring associated with data packets that are ready to be processed by the worker stages, and use the assigned cores 230 to execute worker functions, such as compression, decompression, encryption, decryption, firewall services, and or other functions on the packet data, and update the metadata to indicate a completion status of each worker stage. The output stage management module 376, in the illustrative embodiment, is configured to assign one or more cores 230, or the NIC 218, to one or more output stages, and use the assigned components to iterate through the slots in the ring to prime (i.e., fill) entries in the ring with transmit descriptors, identify entries having metadata indicating that the associated data packets are ready for transmission, and provide the received processed packet data to the communication circuitry 216 (e.g., the NIC 218) using DMA, for transmission to another device, such as the destination endpoint node 108.

It should be appreciated that each of the input stage management module 372, the worker stage management module 374, and the output stage management module 376 may be separately embodied as hardware, firmware, software, virtualized hardware, emulated architecture, and/or a combination thereof. For example, the input stage management module 372 may be embodied as a hardware component, while the worker stage management module 374 and the output stage management module 376 are embodied as virtualized hardware components or as some other combination of hardware, firmware, software, virtualized hardware, emulated architecture, and/or a combination thereof.

Figure 4:
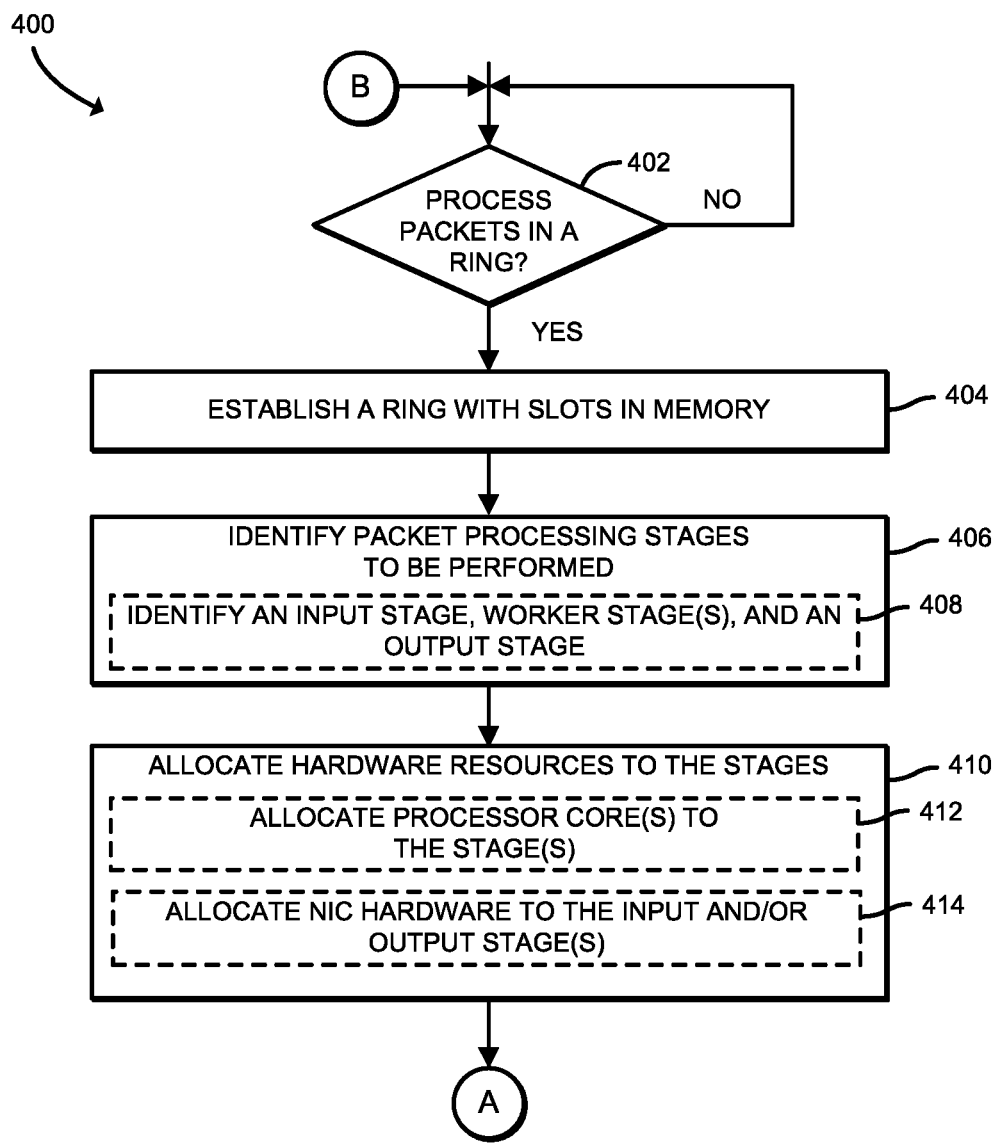
FIGS. 4-5 are a simplified flow diagram of at least one embodiment of a method for processing packets that may be performed by the network device of FIGS. 1 and 2.

Referring now to FIG. 4, in use, the network device 106 may execute a method 400 for processing packets. The method 400 begins with block 402, in which the network device 106 determines whether to process packets in a ring. In the illustrative embodiment, the network device 106 determines whether hardware components (i.e., cores 230 and/or the NIC 218) are available for executing different stages of processing (i.e., one or more input stages, one or more output stages, and one or more worker stages) and determines to process packets in a ring if the components are available. Additionally or alternatively, the network device 106 may determine to process packets in a ring based on configuration settings, a request provided from another compute device or from a user (e.g., through a graphical user interface), or other factors. Regardless, if the network device 106 determines to process data packets in a ring, the method 400 advances to block 404 in which the network device 106 establishes a ring (i.e., a circular buffer) in the memory 212. In the illustrative embodiment, the network device 106 allocates a buffer with a size that is a power of two. Doing so enables simple masking to convert from a stage's internal sequence number to an index (i.e., slot number) into the ring. The network device 106 establishes slots within the buffer. As described above, each slot has a sequence number (i.e., an index or slot number) and may hold an entry (i.e., a receive descriptor, metadata, and a transmit descriptor) associated with a data packet. In block 406, the network device 106 identifies packet processing stages to be performed. As entries are not removed from the ring, re-ordering is not required and sequence numbers indicate arrival order. The network device 106 may identify the packet processing stages based on an assigned function of the network device 106, defined in configuration settings, one or more applications loaded on the network device 106, or otherwise. For example, some embodiments of the network device 106 may be configured to perform firewall or malware detection services while other embodiments may be configured to perform data encryption or compression services. Yet other embodiments may be configured to perform a combination of these services and/or other services. In identifying the stages, the illustrative network device 106 identifies one or more input stages for performing priming of the slots in the ring with receive descriptors and managing reception of packets, one or more worker stages, and one or more output stage for priming the slots in the ring with transmit descriptors and managing transmission of packets, as indicated in block 408.

After the stages have been identified, the method 400 advances to block 410 in which the network device 106 allocates hardware resources to the stages. In doing so, the network device 106 may assign one or more cores 230 of the CPU 210 to the stages, as indicated in block 412. By default, the network device 106 assigns cores 230 to the various stages, unless the NIC 218 includes one or more components to facilitate the input and/or output stages, such as the ring access logic 220. In such embodiments, the network device 106 may assign all or a portion of the operations of the input and output stages to the NIC 218, as indicated in block 414. With regard to the worker stages, the network device 106 may allocate multiple cores 230, such as cores 234, 236 to multiple instances of the same worker stage and/or may allocate different cores 230 to different worker stages. As described in more detail herein, when multiple instances of the same stage (e.g., input stage, worker stage, or output stage) have been allocated, the illustrative network device 106 employs methods to prevent two or more instances of the same stage from attempting to operate on the same entry in the ring. In embodiments with multiple different worker stages, some worker stages may be dependent on the results of other worker stages. For example, a data analysis stage may be dependent on completion of a data decompression stage.

Figure 5:
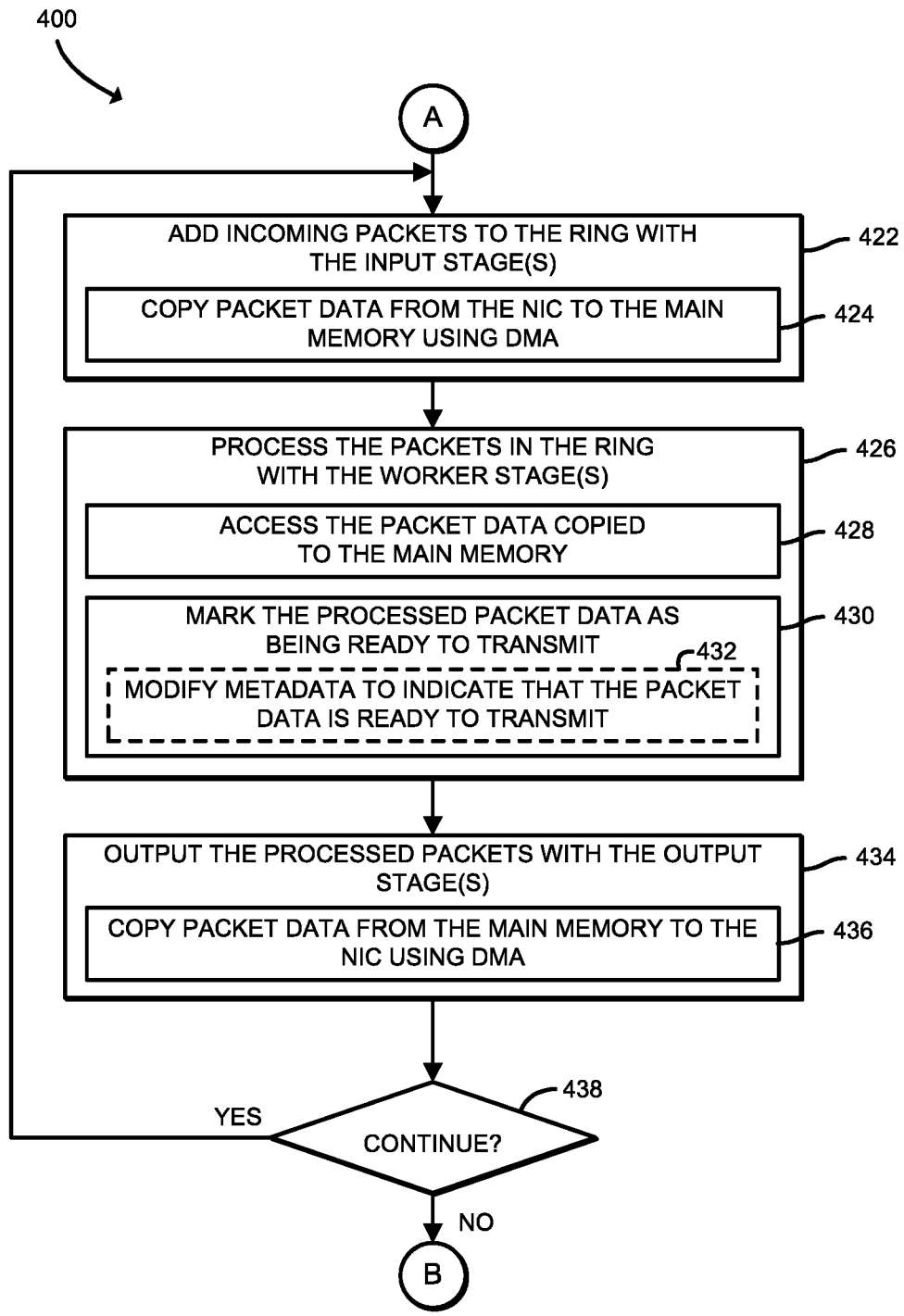

Referring now to FIG. 5, after the hardware resources have been allocated to the stages, the network device 106 adds incoming data packets to the ring with the input stage. In doing so, the incoming packets are assigned to entries in slots of the ring that have been primed with receive descriptors by the input stage(s). As described above, each receive descriptor includes a pointer to a memory buffer in the main memory 212 where the packet data is to be stored. In storing the packet data to these memory buffers, the network device 106 copies the packet data from the NIC 218 to the main memory 212 using DMA. The packet receiving process is described in more detail with reference to FIGS. 6 and 7.

Further, in block 426, the network device 106 processes the data packets represented by the entries in the ring with the worker stages. In doing so, the worker stages, which, in the illustrative embodiment, are executed as software processes or threads by one or more of the cores 230, access the packet data that was copied by DMA from the NIC 218 to the memory buffers in the main memory 212, as indicated in block 428. In block 430, the network device 106 marks a completely processed packet as being ready to transmit when the worker stages have finished performing their respective operations on the packet data. In marking packet as being ready to transmit, the network device 106 may modify the metadata associated with the corresponding entry in the ring to indicate that the packet data is ready to transmit, as indicated in block 432.

Additionally, in block 434, the network device 106 outputs the processed packets (i.e., provides the processed packets to the NIC 218) with the one or more output stages. As described in more detail herein, with reference to FIGS. 8 and 9, the one or more output stages prime the entries in the ring with transmit descriptors that each include a pointer to the memory buffer that contains the packet data for the corresponding ring entry. As part of outputting the processed packets, the network device 106 copies the packet data from the buffers in the main memory 212 to the NIC 218 using DMA, as indicated in block 436. While the blocks 422 through 434 are shown in sequence, in the illustrative embodiment, the stages execute concurrently such that the one or more input stages may be priming entries in the ring at one rate, while packets are received and moved to the memory buffers at another rate, while the worker stages are processing other data packets that are already in the ring, and while the one or more output stages manage transmission of packets out of the network device 106 at other rates. In block 438, the network device 106 determines whether to continue operation of the stages on the data packets. In the illustrative embodiment, the network device 106 may be configured to continue operation of the stages unless an express request to stop is provided, such as a request transmitted from another device, a request from a process or application executing on the network device 106, or a request input from a person through a graphical user interface. If the network device 106 determines to continue, the method 400 loops back to block 422 in which the network device 106 again adds one or more incoming packets to the ring with the input stage. Otherwise, the method 400 loops back to block 402 to determine whether to process packets in a ring.

Figure 6:
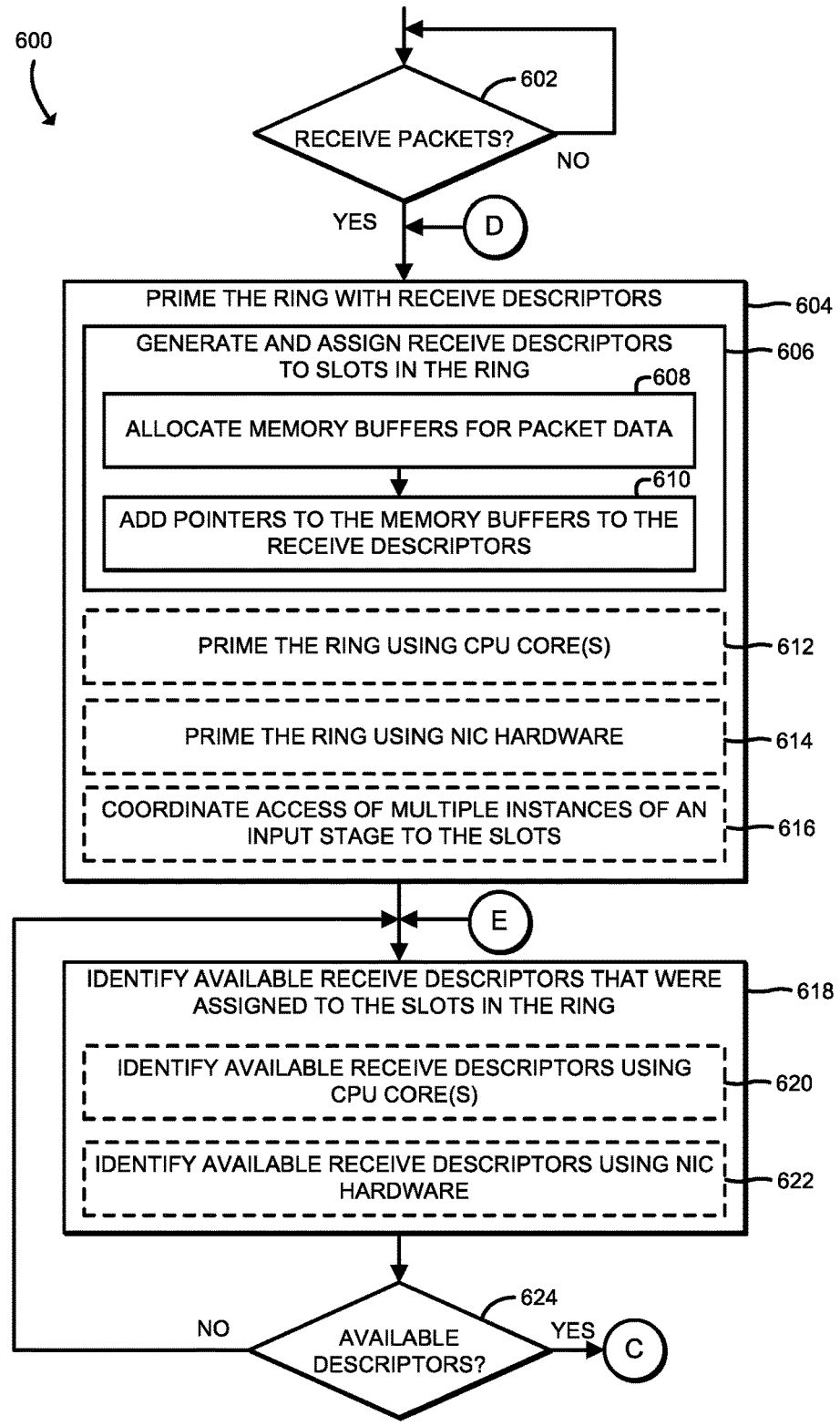
FIGS. 6-7 are a simplified flow diagram of at least one embodiment of a method for receiving data packets that may be performed by the network device of FIGS. 1 and 2.
Figure 7:
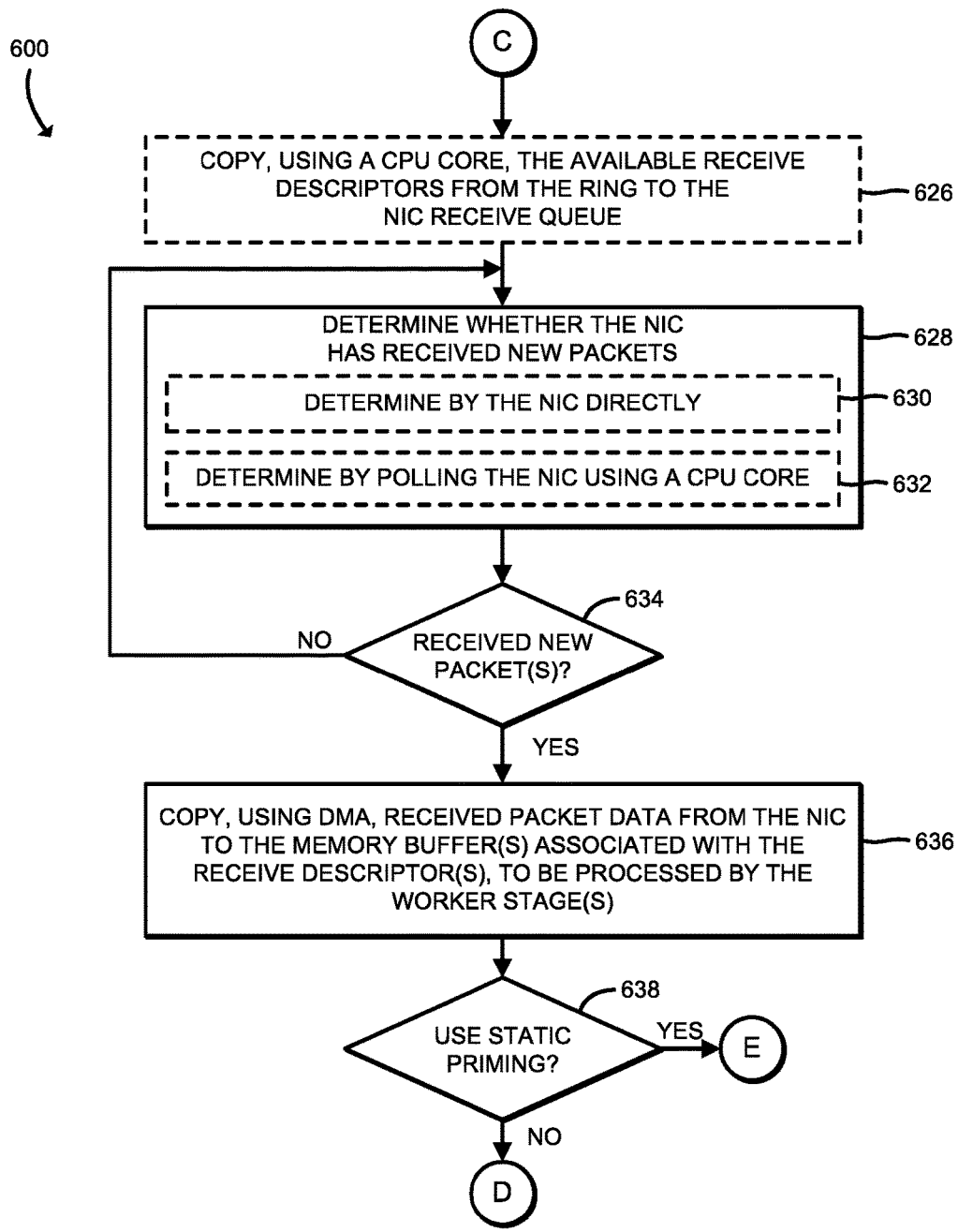

Referring now to FIG. 6, in use, the network device 106 may execute a method 600 for receiving data packets by one or more input stages. The method 600 corresponds to block 422 of FIG. 5. In the illustrative embodiment, the hardware resources allocated to the one or more input stages (i.e., one or more of the cores 230 and/or the NIC 218) perform the method 600. The method 600 begins with block 602, in which the network device 106 determines whether to receive data packets. In the illustrative embodiment, the network device 106 determines to receive network packets if hardware resources have been assigned to the one or more input stages and the network device 106 has not received a request from another device, a process or application executed on the network device 106, or a user, to stop receiving packets. In response to a determination to receive data packets, the method 600 advances to block 604 in which the network device 106 primes the ring with receive descriptors. In doing so, as indicated in block 606, the network device 106 generates and assigns receive descriptors to slots in the ring, as entries. As part of this process, the network device 106 allocates a memory buffer for packet data, as indicated in block 608, and adds a pointer to the memory buffer to a corresponding receive descriptor, as indicated in block 610. The network device 106 performs block 608 and 610 for every receive descriptor assigned to a corresponding slot in the ring. Further, in embodiments in which the NIC 218 does not include hardware (e.g., the ring access logic 220) to prime the ring directly, the network device 106 primes the ring using one or more cores 230 assigned to the one or more input stages, as indicated in block 612. In other embodiments, as indicated in block 614, the network device 106 may prime the ring using the NIC 218 hardware (i.e., the ring access logic 220). Further, in embodiments in which multiple input stages are to prime the ring, the network device 106 coordinates their access to the ring slots to prevent them from attempting to prime the same slot, as indicated in block 616. In the illustrative embodiment, the input stages may use a modulo function in which each instance of the input stage follows a rule that it only processes an entry when the sequence number of the instance of the input stage, modulo the number of instances of the input stage, is equal to a stage instance identifier assigned to that instance of the input stage. Further, when a particular ring entry has been primed (i.e., the receive descriptor has been added to that entry), the corresponding input stage also adds metadata to the entry, indicating that the entry has been primed and that the memory buffer associated with the receive descriptor is available to receive packet data.

In block 618, the network device 106 identifies available receive descriptors that were assigned to the slots in the ring, such as by identifying entries in the ring having metadata that indicates that the memory buffer associated with a descriptor is available to receive packet data. This process may be referred to as polling and may be executed by one or more cores 230 of the CPU 210, as indicated in block 620. Alternatively, as indicated in block 622, this polling process may be executed by the NIC 218, such as in embodiments in which the NIC 218 includes the ring access logic 220.

In block 624, the network device 106 determines whether descriptors are available in the ring. If not, the method 600 loops back to block 618 in which the network device 106 again identifies available receive descriptors in the ring. Otherwise, the method 600 may advance to block 626 of FIG. 7, in which the network device 106 copies, using at least one core 230 that was assigned to an input stage, the one or more available receive descriptors from the ring to the NIC receive queue (i.e., the NIC queue data 308). While the ring and the NIC receive queue may both be stored in the main memory 212, the ring may differ in structure compared to the NIC receive queue. More specifically, while the entries stored in the slots of the ring may include receive descriptors, metadata, and transmit descriptors interleaved with each other, the NIC receive queue contains contiguous receive descriptors. Accordingly, in embodiments in which the NIC 218 is not equipped to access the receive descriptors in the ring directly (i.e., not equipped to skip over the non-receive descriptor data), the network device 106 copies the receive descriptors from the ring entries to the separate NIC receive queue to provide the sequential, contiguous arrangement of the receive descriptors for the NIC 218 to access.

In block 628, the network device 106 determines whether the NIC 218 has received new packets. In doing so, the NIC 218 may make this determination directly, as indicated in block 630. Alternatively, a core 230 of the CPU 210 executing a software thread may make this determination by polling the NIC 218, as indicated in block 632. In block 634, the network device 106 determines whether new packets have been received. If not, the method 600 loops back to block 628 in which the network device 106 again determines whether the NIC 218 has received new packets. Otherwise, the method 600 advances to block 636, in which the network device 106 copies, using DMA, received packet data from the NIC 218 to the memory buffers associated with the corresponding receive descriptors. By doing so, the packet data is now available in the memory buffers referenced by the entries in the ring and may be accessed by the worker stages for processing. In some embodiments, the network device 106 updates the metadata for these ring entries to indicate that the entries are ready to be processed by the worker stages. In block 638, the network device 106 determines whether it is to use static priming or not. In the illustrative embodiment, static priming means that the network device 106 primes the slots of the ring only once, and then reuses the same descriptors and memory buffers over and over, rather than continually regenerating the descriptors and reallocating new memory buffers for subsequent packets. Whether to use static priming may be based on a configuration setting stored in the memory, a hardware configuration, or other criteria. Regardless, in response to a determination not to use static priming, the method 600 loops back to block 604 of FIG. 6, to again prime the ring with receive descriptors. Otherwise, the method 600 loops back to block 618 to identify available receive descriptors in the ring.

Figure 8:
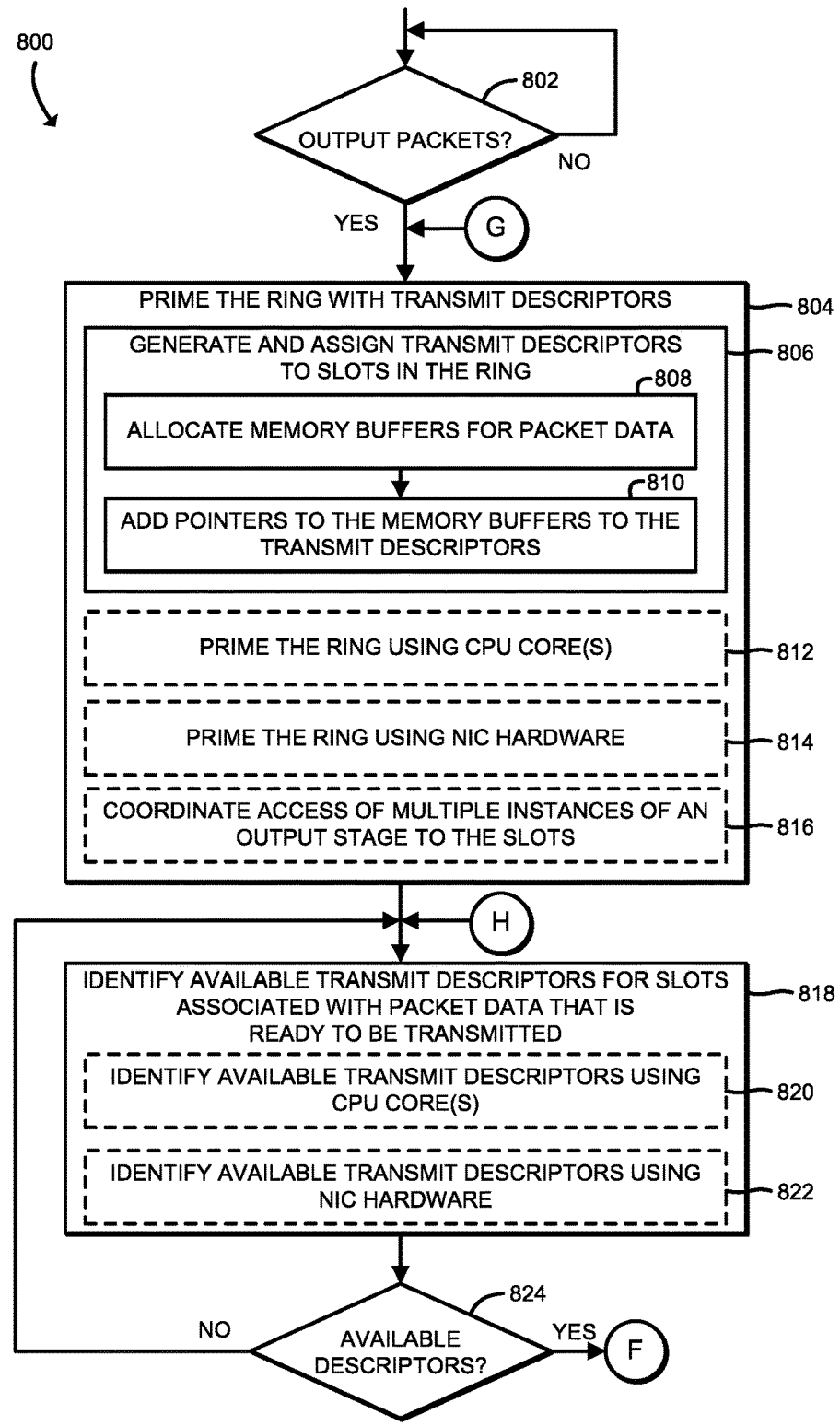
FIG. 8-9 are a simplified flow diagram of at least one embodiment of a method for outputting packets that may be performed by the network device of FIGS. 1 and 2.
Figure 9:
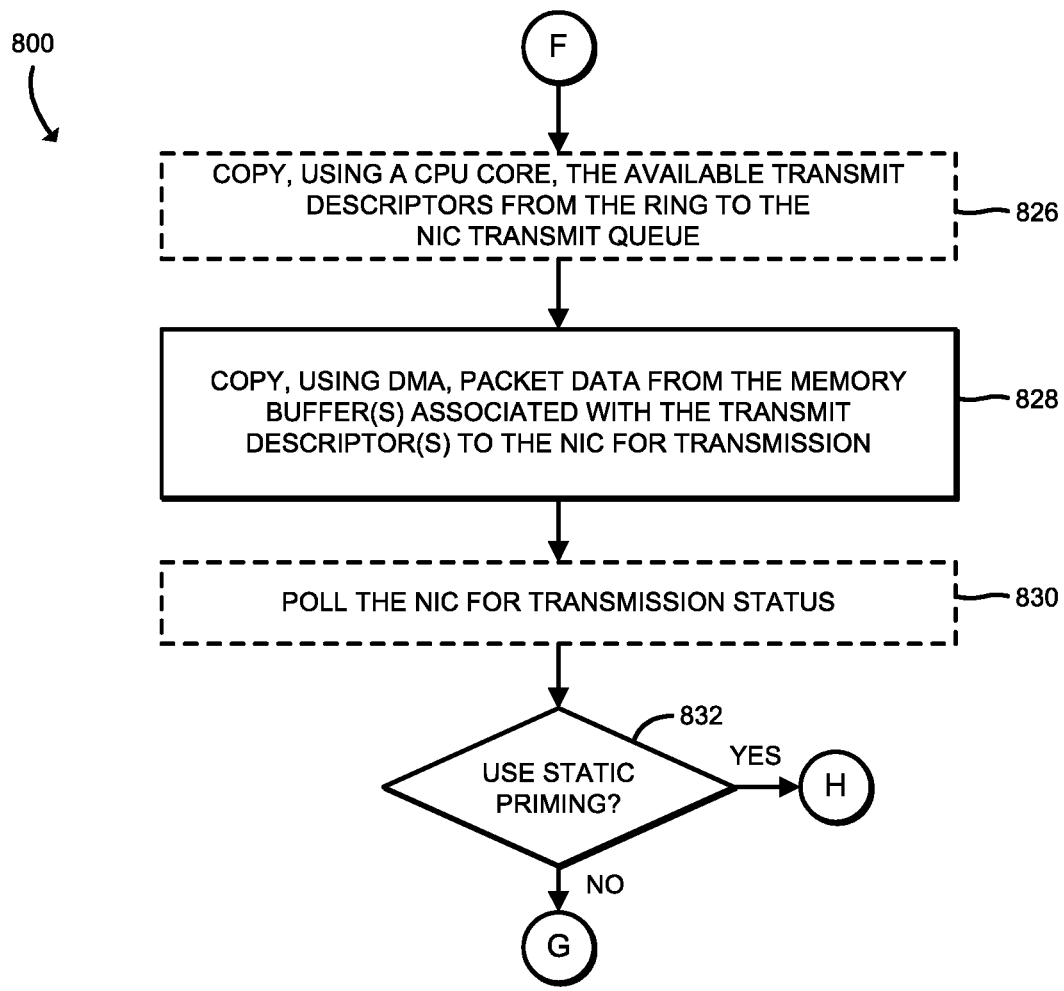

Referring now to FIG. 8, in use, the network device 106 may execute a method 800 for outputting (i.e., transmitting) data packets by one or more output stages. The method 800 corresponds to block 434 of FIG. 5. In the illustrative embodiment, the hardware resources allocated to the one or more output stages (i.e., one or more of the cores 230 and/or the NIC 218) perform the method 800. The method 800 begins with block 802, in which the network device 106 determines whether to output data packets. In the illustrative embodiment, the network device 106 determines to output data packets if hardware resources have been allocated to the one or more output stages, the network device 106 has not received a request from another device, a process or application executed on the network device 106, or a user, to stop outputting data packets, and one or more entries in the ring have been completely processed by the worker stages (e.g., as indicated by metadata stored by the worker stages in association with each ring entry). In response to a determination to output data packets, the method 800 advances to block 804 in which the network device 106 primes the ring with transmit descriptors. In doing so, as indicated in block 806, the network device 106 generates and assigns transmit descriptors to slots in the ring, as entries. As part of this process, the network device 106 allocates a memory buffer for packet data, as indicated in block 808, and adds a pointer to the memory buffer to a corresponding transmit descriptor, as indicated in block 810. The network device 106 performs blocks 808 and 810 for every transmit descriptor assigned to a corresponding slot in the ring. Further, in embodiments in which the NIC 218 does not include hardware (e.g., the ring access logic 220) to prime the ring directly, the network device 106 primes the ring using one or more cores 230 assigned to the one or more output stages, as indicated in block 812. In other embodiments, as indicated in block 814, the network device 106 may prime ring using the NIC 218 hardware (i.e., the ring access logic 220). Further, in embodiments in which multiple output stages are to prime the ring, the network device 106 coordinates their access to the ring slots to prevent them from attempting to prime the same slot, as indicated in block 816. In the illustrative embodiment, the output stages may use a modulo function in which each instance of the output stage follows a rule that it only processes an entry when the sequence number of the instance of the output stage, modulo the number of instances of the output stage, is equal to a stage instance identifier assigned to that instance of the output stage. Further, when a particular ring entry has been primed (i.e., the transmit descriptor has been added to that entry), the corresponding output stage also adds metadata to the entry, indicating that the entry has been primed and the associated packet data is available to be provided to the NIC 218.

In block 818, the network device 106 identifies available transmit descriptors that were assigned to the slots in the ring, such as by identifying entries in the ring having metadata that indicates that the packet data is available to be provided to the NIC 218 for transmission. This process may be referred to as polling and may be executed by one or more cores 230 of the CPU 210, as indicated in block 820. Alternatively, as indicated in block 822, this polling process may be executed by the NIC 218, such as in embodiments in which the NIC 218 includes the ring access logic 220.

In block 824, the network device 106 determines whether transmit descriptors are available in the ring. If not, the method 800 loops back to block 818 in which the network device 106 again identifies available transmit descriptors in the ring. Otherwise, the method 800 may advance to block 826 of FIG. 9, in which the network device 106 copies, using at least one core 230 that was assigned to an input stage, the one or more available transmit descriptors from the ring to the NIC transmit queue (i.e., the NIC queue data 308). Similar to the NIC receive queue, in which receive descriptors are arranged contiguously in sequence, the NIC transmit queue contains transmit descriptors arranged contiguously in sequence. Similar to block 626, which is performed by embodiments in which the NIC 218 is not equipped to access the receive descriptors directly in the ring, block 826 is performed by those embodiments in which the NIC 218 is not equipped to access the transmit descriptors directly in the ring (i.e., embodiments in which the NIC 218 does not include the ring access logic 220).

In block 828, the network device 106 copies, using DMA, the packet data from the memory buffers associated with the transmit descriptors that are available (i.e., those entries having metadata indicating that the worker stages have completed their processing of the packet data) to the NIC 218 for transmission to another device (i.e., the destination endpoint node 108). In block 830, the network device 106 may poll the NIC 218 for transmission status, to determine when the transmission has been completed.

In block 832, the network device 106 determines whether it is to use static priming. This determination is similar to the determination made in block 632 of FIG. 7 and is based on similar criteria (i.e., a configuration setting stored in memory, a hardware configuration, etc.). In response to a determination that the network device 106 is not to use static priming, the method 800 loops back to block 804 of FIG. 8, in which the network device 106 again primes the ring with transmit descriptors. Otherwise, the method 800 loops back to block 818 of FIG. 8, in which the network device 106 again identifies available transmit descriptors for packet data that is ready to be transmitted.

Referring now to FIG. 10, a process 1000 corresponding to embodiments of the method 600 in which the NIC 218 does not include the ring access logic 220 is shown. As shown, one or more priming threads 1010 associated with one or more input stages are executed by one or more cores 230 of the CPU 210. These priming threads 1010 independently fill slot entries of a ring 1020 with receive descriptors and pointers to buffers in the main memory 212 that have been allocated to store packet data. A polling thread 1030 associated with an input stage is also executed by one of the cores 230 of the CPU 210. The polling thread 1030 polls the ring 1020 to identify available (i.e., free) primed receive descriptors in the ring 1020. As described with reference to the method 600, a receive descriptor may be identified as being available (i.e., free or primed) based on metadata stored in the ring entry by one of the input stages (i.e., one of the priming threads). In other embodiments, a receive descriptor may be identified as being available based on other criteria. The polling thread 1030 adds the available receive descriptors to the receive queue of the NIC 218 (i.e., copies the receive descriptors from the ring to the NIC receive queue). Further, the polling thread 1030 polls for packets that have been received by the NIC 218. In response to the NIC 218 receiving a packet, the NIC 218 directly copies the data of the packet to a corresponding memory buffer referenced by the associated receive descriptor, which, as described above, is stored as part of an entry in a slot of the ring 1020. Further, one or more worker threads 1040 (i.e., worker stages) may poll for and identify packet data that is ready for processing and access the packet data in place on the ring 1020 (i.e., by accessing the packet data stored in the memory buffer referenced by the entry in the ring 1020).

Referring now to FIG. 11, a process 1100 corresponding to embodiments of the method 600 in which the NIC 218 does include the ring access logic 220 is shown. In the process 1100, one or more priming threads 1110 independently fill slot entries of a ring 1120 with receive descriptors and buffer pointers, as described above with reference to FIG. 10. However, in the process 1100, the priming threads may be executed by one or more cores 230 of the CPU 210 or by the NIC 218 itself, depending on whether this priming function is implemented in the ring access logic 220 of the NIC 218. If not, then the priming is performed by one or more of the cores 230 of the CPU 210. The NIC 218, using the ring access logic 220, executes a polling process 1130 to poll the ring to identify available primed descriptors in the ring 1120, such as by reading the metadata of the entries to identify entries having metadata indicating that the receive descriptor has been primed and/or that the memory buffer is available to receive packet data. Further, when the NIC 218 receives one or more new packets, the NIC 218 copies the packet data to the memory buffers identified by the receive descriptors in the ring entries. Further, one or more worker threads (i.e., worker stages) 1140 poll for and identify packet data that is ready for processing and access the packet data in place on the ring 1120 (i.e., by accessing the packet data stored in the memory buffer referenced by the entry in the ring 1120), as described above. Given that the NIC 218 has offloaded input stage functionality from the cores 230 of the CPU 210, the process 1100 may be more efficient than the process 1000 and may free up more of the cores 230 for use by the worker stages.

Referring now to FIG. 12, a process 1200 corresponding to embodiments of the method 800 in which the NIC 218 does not include the ring access logic 220 is shown. As shown, one or more worker stages (i.e., worker threads) 1210 mark packets as ready to transmit, such as by updating the metadata of the ring entries associated with those packets. Further, as shown, one or more priming threads 1220 associated with one or more output stages are executed by one or more cores 230 of the CPU 210. The priming threads 1220 independently fill slot entries of a ring 1230 with transmit descriptors and pointers to the buffers in the main memory that contain the processed packet data that is ready to be transmitted. A polling thread 1240 associated with an output stage is also executed by one of the cores 230 of the CPU 210. The polling thread 1240 polls the ring to identify available (i.e., free) primed transmit descriptors in the ring 1230. As described with reference to the method 800, a transmit descriptor may be identified as being available (i.e., free or primed) based on metadata stored in the ring entry by one of the output stages (i.e., one of the priming threads). In other embodiments, a transmit descriptor may be identified as being available based on other criteria. The polling thread 1240 adds the available transmit descriptors to the transmit queue of the NIC 218 (i.e., copies the transmit descriptors from the ring 1230 to the NIC transmit queue). Further, the network device 106 copies the packet data from the memory buffers referenced in the ring 1230 to the NIC 218 using DMA. The NIC 218 transmits the packet data that was copied to it via DMA and the polling thread 1240 polls the NIC 218 for transmission status.

Referring now to FIG. 13, a process 1300 corresponding to embodiments of the method 800 in which the NIC 218 does include the ring access logic 220 is shown. In the process 1300, one or more worker stages (i.e., worker threads) 1310 mark packets as ready to transmit, as described above with reference to FIG. 12. Further, one or more priming threads 1320 independently fill slot entries of a ring 1330 with transmit descriptors and pointers to the memory buffers where the processed packet data is stored. In the process 1300, the priming threads 1320 may be executed by one or more cores 230 of the CPU 210 or by the NIC 218 itself, depending on whether this priming function is implemented in the ring access logic 220 of the NIC 218. If not, then the priming is performed by one or more of the cores 230 of the CPU 210. The NIC 218, using the ring access logic 220, polls the ring 1330 to identify available primed descriptors in the ring 1330, such as by reading the metadata of the entries to identify entries having metadata indicating that the transmit descriptor has been primed. Further, the NIC 218 copies the packet data from the memory buffers referenced by the primed transmit descriptors in the ring 1330 to the NIC 218 using DMA and transmits the packet data to another device (e.g., the destination endpoint node 108). Additionally, the NIC 218 generates a status update indicating that the one or more packets have been transmitted. Subsequently, the memory buffer that held the packet data may be used to store other packet data. By offloading output stage functions (i.e., priming and/or polling) to the NIC 218, the process 1300 may be more efficient than the process 1200, and more cores 230 of the CPU 210 may be available for use by the worker stages.

EXAMPLES

Illustrative examples of the technologies disclosed herein are provided below. An embodiment of the technologies may include any one or more, and any combination of, the examples described below.

Example 1 includes a network device to process packets, the network device comprising one or more processors that include a plurality of cores; a network interface controller (NIC) coupled to the one or more processors; and one or more memory devices having stored therein a plurality of instructions that, when executed by the one or more processors, cause the network device to establish a ring in a memory of the one or more memory devices, wherein the ring is defined as a circular buffer and includes a plurality of slots to store entries representative of packets; generate and assign receive descriptors to the slots in the ring, wherein each receive descriptor includes a pointer to a corresponding memory buffer to store packet data; determine whether the NIC has received one or more packets; and copy, with direct memory access (DMA) and in response to a determination that the NIC has received one or more packets, packet data of the received one or more packets from the NIC to the memory buffers associated with the receive descriptors assigned to the slots in the ring.

Example 2 includes the subject matter of Example 1, and wherein to generate and assign the receive descriptors to the slots in the ring comprises to generate and assign the receive descriptors with one or more of the cores.

Example 3 includes the subject matter of any of Examples 1 and 2, and wherein to generate and assign the receive descriptors to the slots in the ring comprises to generate and assign the receive descriptors with one or more hardware components of the NIC.

Example 4 includes the subject matter of any of Examples 1-3, and wherein to generate and assign the receive descriptors to the slots in the ring comprises to generate and assign the receive descriptors using multiple instances of an input stage executed as separate threads.

Example 5 includes the subject matter of any of Examples 1-4, and wherein the plurality of instructions, when executed by the one or more processors, further cause the network device to coordinate access of the multiple instances of the input stage to the slots with a modulo function.

Example 6 includes the subject matter of any of Examples 1-5, and wherein the plurality of instructions, when executed by the one or more processors, further cause the network device to identify available receive descriptors in the ring before the packet data is copied from the NIC, and wherein to copy the packet data from the NIC comprises to copy the packet data from the NIC to the memory buffers associated with the identified available receive descriptors.

Example 7 includes the subject matter of any of Examples 1-6, and wherein to identify the available receive descriptors comprises to identify the available receive descriptors with one or more of the cores.

Example 8 includes the subject matter of any of Examples 1-7, and wherein to identify the available receive descriptors comprises to identify the available receive descriptors with one or more hardware components of the NIC.

Example 9 includes the subject matter of any of Examples 1-8, and wherein to identify the available receive descriptors comprises to sequentially iterate through each slot in the ring and analyze metadata stored in association with each slot for an indication that one or more of the receive descriptors is available.

Example 10 includes the subject matter of any of Examples 1-9, and wherein the plurality of instructions, when executed by the one or more processors, further cause the network device to copy the receive descriptors from the ring to a NIC receive queue before the determination of whether the NIC has received one or more packets.

Example 11 includes the subject matter of any of Examples 1-10, and wherein to determine whether the NIC has received one or more packets comprises to poll the NIC with one or more of the cores.

Example 12 includes the subject matter of any of Examples 1-11, and wherein the plurality of instructions, when executed by the one or more processors, further cause the network device to generate and assign transmit descriptors to the slots in the ring, wherein each transmit descriptor includes a pointer to a corresponding memory buffer where packet data to be transmitted is stored; identify transmit descriptors for slots of the ring associated with packet data that has been marked as ready to transmit; copy, with DMA, packet data from the memory buffers associated with the identified transmit descriptors to the NIC for transmission.

Example 13 includes the subject matter of any of Examples 1-12, and wherein to generate and assign the transmit descriptors to the slots in the ring comprises to generate and assign the transmit descriptors with one or more of the cores.

Example 14 includes the subject matter of any of Examples 1-13, and wherein to generate and assign the transmit descriptors to the slots in the ring comprises to generate and assign the transmit descriptors with one or more hardware components of the NIC.

Example 15 includes the subject matter of any of Examples 1-14, and wherein the plurality of instructions, when executed by the one or more processors, further cause the network device to process the packet data with one or more worker stages; and modify metadata associated with the slots that are associated with the packet data to indicate that the packet data is ready to be transmitted, before the packet data is copied to the NIC for transmission.

Example 16 includes the subject matter of any of Examples 1-15, and wherein the plurality of instructions, when executed by the one or more processors, further cause the network device to copy the identified transmit descriptors to a NIC transmit queue before the packet data is copied from the memory buffers to the NIC.

Example 17 includes a method for processing packets, comprising establishing, by a network device, a ring in a memory of the network device, wherein the ring is defined as a circular buffer and includes a plurality of slots to store entries representative of packets; generating and assigning, by the network device, receive descriptors to the slots in the ring, wherein each receive descriptor includes a pointer to a corresponding memory buffer to store packet data; determining, by the network device, whether a network interface controller (NIC) of the network device has received one or more packets; and copying, with direct memory access (DMA) and in response to a determination that the NIC has received one or more packets, packet data of the received one or more packets from the NIC to the memory buffers associated with the receive descriptors assigned to the slots in the ring.

Example 18 includes the subject matter of Example 17, and wherein generating and assigning the receive descriptors to the slots in the ring comprises generating and assigning the receive descriptors with one or more cores of a processor of the network device.

Example 19 includes the subject matter of any of Examples 17 and 18, and wherein generating and assigning the receive descriptors to the slots in the ring comprises generating and assigning the receive descriptors with one or more hardware components of the NIC.

Example 20 includes the subject matter of any of Examples 17-19, and wherein generating and assigning the receive descriptors to the slots in the ring comprises generating and assigning the receive descriptors using multiple instances of an input stage executed as separate threads.

Example 21 includes the subject matter of any of Examples 17-20, and furthering including coordinating, by the network device, access of the multiple instances of the input stage to the slots with a modulo function.

Example 22 includes the subject matter of any of Examples 17-21, and furthering including identifying, by the network device, available receive descriptors in the ring before the packet data is copied from the NIC, and wherein copying the packet data from the NIC comprises copying the packet data from the NIC to the memory buffers associated with the identified available receive descriptors.

Example 23 includes the subject matter of any of Examples 17-22, and wherein identifying the available receive descriptors comprises identifying the available receive descriptors with one or more cores of a processor of the network device.

Example 24 includes the subject matter of any of Examples 17-23, and wherein identifying the available receive descriptors comprises identify the available receive descriptors with one or more hardware components of the NIC.

Example 25 includes the subject matter of any of Examples 17-24, and wherein identifying the available receive descriptors comprises sequentially iterating through each slot in the ring; and analyzing metadata stored in association with each slot for an indication that one or more of the receive descriptors is available.

Example 26 includes the subject matter of any of Examples 17-25, and furthering including copying, by the network device, the receive descriptors from the ring to a NIC receive queue before the determination of whether the NIC has received one or more packets.

Example 27 includes the subject matter of any of Examples 17-26, and wherein determining whether the NIC has received one or more packets comprises polling the NIC with one or more cores of a processor of the network device.

Example 28 includes the subject matter of any of Examples 17-27, and furthering including generating and assigning, by the network device, transmit descriptors to the slots in the ring, wherein each transmit descriptor includes a pointer to a corresponding memory buffer where packet data to be transmitted is stored; identifying, by the network device, transmit descriptors for slots of the ring associated with packet data that has been marked as ready to transmit; and copying, with DMA, packet data from the memory buffers associated with the identified transmit descriptors to the NIC for transmission.

Example 29 includes the subject matter of any of Examples 17-28, and wherein generating and assigning the transmit descriptors to the slots in the ring comprises generating and assigning the transmit descriptors with one or more cores of a processor of the network device.

Example 30 includes the subject matter of any of Examples 17-29, and wherein generating and assigning the transmit descriptors to the slots in the ring comprises generating and assigning the transmit descriptors with one or more hardware components of the NIC.

Example 31 includes the subject matter of any of Examples 17-30, and furthering including processing, by the network device, the packet data with one or more worker stages; and modifying, by the network device, metadata associated with the slots that are associated with the packet data to indicate that the packet data is ready to be transmitted, before the packet data is copied to the NIC for transmission.

Example 32 includes the subject matter of any of Examples 17-31, and furthering including copying, by the network device, the identified transmit descriptors to a NIC transmit queue before the packet data is copied from the memory buffers to the NIC.

Example 33 includes a network device comprising one or more processors; and a memory having stored therein a plurality of instructions that when executed by the one or more processors cause the network device to perform the method of any of Examples 17-32.

Example 34 includes one or more machine-readable storage media comprising a plurality of instructions stored thereon that in response to being executed result in a network device performing the method of any of Examples 17-32.

Example 35 includes a network device to process packets, the network device comprising one or more processors that include a plurality of cores; one or more memory devices coupled to the one or more processors; a network interface controller (NIC) coupled to the one or more processors; ring management circuitry to (i) establish a ring in a memory of the one or more memory devices, wherein the ring is defined as a circular buffer and includes a plurality of slots to store entries representative of packets, and (ii) generate and assign receive descriptors to the slots in the ring, wherein each receive descriptor includes a pointer to a corresponding memory buffer to store packet data; network communication circuitry to determine whether the NIC has received one or more packets; and direct memory access (DMA) circuitry to copy, with DMA and in response to a determination that the NIC has received one or more packets, packet data of the received one or more packets from the NIC to the memory buffers associated with the receive descriptors assigned to the slots in the ring.

Example 36 includes the subject matter of Example 35, and wherein to generate and assign the receive descriptors to the slots in the ring comprises to generate and assign the receive descriptors with one or more of the cores.

Example 37 includes the subject matter of any of Examples 35 and 36, and wherein to generate and assign the receive descriptors to the slots in the ring comprises to generate and assign the receive descriptors with one or more hardware components of the NIC.

Example 38 includes the subject matter of any of Examples 35-37, and wherein to generate and assign the receive descriptors to the slots in the ring comprises to generate and assign the receive descriptors using multiple instances of an input stage executed as separate threads.

Example 39 includes the subject matter of any of Examples 35-38, and wherein the ring management circuitry is further to coordinate access of the multiple instances of the input stage to the slots with a modulo function.

Example 40 includes the subject matter of any of Examples 35-39, and wherein the ring management circuitry is further to identify available receive descriptors in the ring before the packet data is copied from the NIC, and wherein to copy the packet data from the NIC comprises to copy the packet data from the NIC to the memory buffers associated with the identified available receive descriptors.

Example 41 includes the subject matter of any of Examples 35-40, and wherein to identify the available receive descriptors comprises to identify the available receive descriptors with one or more of the cores.

Example 42 includes the subject matter of any of Examples 35-41, and wherein to identify the available receive descriptors comprises to identify the available receive descriptors with one or more hardware components of the NIC.

Example 43 includes the subject matter of any of Examples 35-42, and wherein to identify the available receive descriptors comprises to sequentially iterate through each slot in the ring and analyze metadata stored in association with each slot for an indication that one or more of the receive descriptors is available.

Example 44 includes the subject matter of any of Examples 35-43, and wherein the ring management circuitry is further to copy the receive descriptors from the ring to a NIC receive queue before the determination of whether the NIC has received one or more packets.

Example 45 includes the subject matter of any of Examples 35-44, and wherein to determine whether the NIC has received one or more packets comprises to poll the NIC with one or more of the cores.

Example 46 includes the subject matter of any of Examples 35-45, and wherein the ring management circuitry is further to generate and assign transmit descriptors to the slots in the ring, wherein each transmit descriptor includes a pointer to a corresponding memory buffer where packet data to be transmitted is stored, and identify transmit descriptors for slots of the ring associated with packet data that has been marked as ready to transmit; and the DMA circuitry is further to copy, with DMA, packet data from the memory buffers associated with the identified transmit descriptors to the NIC for transmission.

Example 47 includes the subject matter of any of Examples 35-46, and wherein to generate and assign the transmit descriptors to the slots in the ring comprises to generate and assign the transmit descriptors with one or more of the cores.

Example 48 includes the subject matter of any of Examples 35-47, and wherein to generate and assign the transmit descriptors to the slots in the ring comprises to generate and assign the transmit descriptors with one or more hardware components of the NIC.

Example 49 includes the subject matter of any of Examples 35-48, and wherein the ring management circuitry is further to process the packet data with one or more worker stages; and modify metadata associated with the slots that are associated with the packet data to indicate that the packet data is ready to be transmitted, before the packet data is copied to the NIC for transmission.

Example 50 includes the subject matter of any of Examples 35-497, and wherein the ring management circuitry is further to copy the identified transmit descriptors to a NIC transmit queue before the packet data is copied from the memory buffers to the NIC.

Example 51 includes a network device to process packets, the network device comprising means for establishing a ring in a memory of the network device, wherein the ring is defined as a circular buffer and includes a plurality of slots to store entries representative of packets; means for generating and assigning receive descriptors to the slots in the ring, wherein each receive descriptor includes a pointer to a corresponding memory buffer to store packet data; network communication circuitry for determining whether a network interface controller (NIC) of the network device has received one or more packets; and direct memory access (DMA) circuitry for copying, with DMA and in response to a determination that the NIC has received one or more packets, packet data of the received one or more packets from the NIC to the memory buffers associated with the receive descriptors assigned to the slots in the ring.

Example 52 includes the subject matter of Example 51, and wherein the means for generating and assigning the receive descriptors to the slots in the ring comprises means for generating and assigning the receive descriptors with one or more cores of a processor of the network device.

Example 53 includes the subject matter of any of Examples 51 and 52, and wherein the means for generating and assigning the receive descriptors to the slots in the ring comprises means for generating and assigning the receive descriptors with one or more hardware components of the NIC.

Example 54 includes the subject matter of any of Examples 51-53, and wherein the means for generating and assigning the receive descriptors to the slots in the ring comprises means for generating and assigning the receive descriptors using multiple instances of an input stage executed as separate threads.

Example 55 includes the subject matter of any of Examples 51-54, and furthering including means for coordinating access of the multiple instances of the input stage to the slots with a modulo function.

Example 56 includes the subject matter of any of Examples 51-55, and furthering including means for identifying available receive descriptors in the ring before the packet data is copied from the NIC, and wherein the means for copying the packet data from the NIC comprises means for copying the packet data from the NIC to the memory buffers associated with the identified available receive descriptors.

Example 57 includes the subject matter of any of Examples 51-56, and wherein the means for identifying the available receive descriptors comprises means for identifying the available receive descriptors with one or more cores of a processor of the network device.

Example 58 includes the subject matter of any of Examples 51-57, and wherein the means for identifying the available receive descriptors comprises means for identifying the available receive descriptors with one or more hardware components of the NIC.

Example 59 includes the subject matter of any of Examples 51-58 and wherein the means for identifying the available receive descriptors comprises means for sequentially iterating through each slot in the ring; and means for analyzing metadata stored in association with each slot for an indication that one or more of the receive descriptors is available.

Example 60 includes the subject matter of any of Examples 51-59, and furthering including means for copying the receive descriptors from the ring to a NIC receive queue before the determination of whether the NIC has received one or more packets.

Example 61 includes the subject matter of any of Examples 51-60, and wherein the network communication circuitry for determining whether the NIC has received one or more packets comprises circuitry for polling the NIC with one or more cores of a processor of the network device.

Example 62 includes the subject matter of any of Examples 51-61, and furthering including means for generating and assigning transmit descriptors to the slots in the ring, wherein each transmit descriptor includes a pointer to a corresponding memory buffer where packet data to be transmitted is stored; means for identifying transmit descriptors for slots of the ring associated with packet data that has been marked as ready to transmit; and the DMA circuitry comprises circuitry for copying, with DMA, packet data from the memory buffers associated with the identified transmit descriptors to the NIC for transmission.

Example 63 includes the subject matter of any of Examples 51-62, and wherein the means for generating and assigning the transmit descriptors to the slots in the ring comprises means for generating and assigning the transmit descriptors with one or more cores of a processor of the network device.

Example 64 includes the subject matter of any of Examples 51-63, and wherein the means for generating and assigning the transmit descriptors to the slots in the ring comprises means for generating and assigning the transmit descriptors with one or more hardware components of the NIC.

Example 65 includes the subject matter of any of Examples 51-64, and furthering including means for processing the packet data with one or more worker stages; and means for modifying metadata associated with the slots that are associated with the packet data to indicate that the packet data is ready to be transmitted, before the packet data is copied to the NIC for transmission.

Example 66 includes the subject matter of any of Examples 51-65, and furthering including means for copying the identified transmit descriptors to a NIC transmit queue before the packet data is copied from the memory buffers to the NIC.

The invention claimed is:

1. A network device to process packets, the network device comprising:
one or more processors that include a plurality of cores;
a network interface controller (NIC) coupled to the one or more processors; and
one or more memory devices having stored therein a plurality of instructions that, when executed by the one or more processors, cause the network device to:
establish a ring in a memory of the one or more memory devices, wherein the ring is defined as a circular buffer to store entries representative of packets;
generate and assign, at a rate that is independent of a rate at which packets are received from a network by the NIC, receive descriptors to the slots in the ring, wherein each receive descriptor corresponds with a memory buffer to store packet data;

determine whether the NIC has received one or more packets;

copy, with direct memory access (DMA) and in response to a determination that the NIC has received one or more packets, packet data of the received one or more packets from the NIC to the memory buffers associated with the receive descriptors assigned to the slots in the ring; and copy the receive descriptors from the ring to a NIC receive queue before the determination of whether the NIC has received one or more packets, wherein the ring comprises one or more of receive descriptors, metadata, and transmit descriptors interleaved with each other and the NIC receive queue comprises contiguous receive descriptors.

2. The network device of claim 1, wherein to generate and assign the receive descriptors to the slots in the ring comprises to generate and assign the receive descriptors with one or more of the cores.

3. The network device of claim 1, wherein to generate and assign the receive descriptors to the slots in the ring comprises to generate and assign the receive descriptors with one or more hardware components of the NIC.

4. The network device of claim 1, wherein to generate and assign the receive descriptors to the slots in the ring comprises to generate and assign the receive descriptors using multiple instances of an input stage executed as separate threads.

5. The network device of claim 4, wherein the plurality of instructions, when executed by the one or more processors, further cause the network device to coordinate access of the multiple instances of the input stage to the slots with a modulo function.

6. The network device of claim 1, wherein the plurality of instructions, when executed by the one or more processors, further cause the network device to identify available receive descriptors in the ring before the packet data is copied from the NIC, and wherein to copy the packet data from the NIC comprises to copy the packet data from the NIC to the memory buffers associated with the identified available receive descriptors.

7. The network device of claim 6, wherein to identify the available receive descriptors comprises to identify the available receive descriptors with one or more of the cores.

8. The network device of claim 6, wherein to identify the available receive descriptors comprises to identify the available receive descriptors with one or more hardware components of the NIC.

9. The network device of claim 6, wherein to identify the available receive descriptors comprises to sequentially iterate through each slot in the ring and analyze metadata stored in association with each slot for an indication that one or more of the receive descriptors is available.

10. The network device of claim 1, wherein to determine whether the NIC has received one or more packets comprises to poll the NIC with one or more of the cores.

11. The network device of claim 1, wherein the plurality of instructions, when executed by the one or more processors, further cause the network device to:

generate and assign transmit descriptors to the slots in the ring, wherein each transmit descriptor includes a pointer to a corresponding memory buffer where packet data to be transmitted is stored;

identify transmit descriptors for slots of the ring associated with packet data that has been marked as ready to transmit;

copy, with DMA, packet data from the memory buffers associated with the identified transmit descriptors to the NIC for transmission.

12. One or more non-transitory machine-readable storage media comprising a plurality of instructions stored thereon that in response to being executed, cause a network device to:

establish a ring in a memory of the network device, wherein the ring is defined as a circular buffer to store entries representative of packets;

generate and assign, at a rate that is independent of a rate at which packets are received from a network by a network interface controller (NIC) of the network device, receive descriptors to the slots in the ring, wherein each receive descriptor corresponds with a memory buffer to store packet data;

determine whether the NIC of the network device has received one or more packets;

copy, with direct memory access (DMA) and in response to a determination that the NIC has received one or more packets, packet data of the received one or more packets from the NIC to the memory buffers associated with the receive descriptors assigned to the slots in the ring; and copy the receive descriptors from the ring to a NIC receive queue before the determination of whether the NIC has received one or more packets, wherein the ring comprises one or more of receive descriptors, metadata, and transmit descriptors interleaved with each other and the NIC receive queue comprises contiguous receive descriptors.

13. The one or more non-transitory machine-readable storage media of claim 12, wherein to generate and assign the receive descriptors to the slots in the ring comprises to generate and assign the receive descriptors with one or more cores of a processor of the network device.

14. The one or more non-transitory machine-readable storage media of claim 12, wherein to generate and assign the receive descriptors to the slots in the ring comprises to generate and assign the receive descriptors with one or more hardware components of the NIC.

15. The one or more non-transitory machine-readable storage media of claim 12, wherein to generate and assign the receive descriptors to the slots in the ring comprises to generate and assign the receive descriptors using multiple instances of an input stage executed as separate threads.

16. The one or more non-transitory machine-readable storage media of claim 15, wherein the plurality of instructions further cause the network device to coordinate access of the multiple instances of the input stage to the slots with a modulo function.

17. The one or more non-transitory machine-readable storage media of claim 12, wherein the plurality of instructions further cause the network device to identify available receive descriptors in the ring before the packet data is copied from the NIC, and wherein to copy the packet data from the NIC comprises to copy the packet data from the NIC to the memory buffers associated with the identified available receive descriptors.

18. The one or more non-transitory machine-readable storage media of claim 17, wherein to identify the available receive descriptors comprises to identify the available receive descriptors with one or more cores of a processor of the network device.

19. The one or more non-transitory machine-readable storage media of claim 17, wherein to identify the available receive descriptors comprises to identify the available receive descriptors with one or more hardware components of the NIC.

20. The one or more non-transitory machine-readable storage media of claim 17, wherein to identify the available receive descriptors comprises to:
sequentially iterate through each slot in the ring; and
analyze metadata stored in association with each slot for an indication that one or more of the receive descriptors is available.

21. The one or more non-transitory machine-readable storage media of claim 12, wherein to determine whether the NIC has received one or more packets comprises to poll the NIC with one or more cores of a processor of the network device.

22. The one or more non-transitory machine-readable storage media of claim 12, wherein the plurality of instructions further cause the network device to:
generate and assign transmit descriptors to the slots in the ring, wherein each transmit descriptor includes a pointer to a corresponding memory buffer where packet data to be transmitted is stored;
identify transmit descriptors for slots of the ring associated with packet data that has been marked as ready to transmit; and
copy, with DMA, packet data from the memory buffers associated with the identified transmit descriptors to the NIC for transmission.

23. A network device to process packets, the network device comprising:
means for establishing a ring in a memory of the network device, wherein the ring is defined as a circular buffer to store entries representative of packets;
means for generating and assigning, at a rate that is independent of a rate at which packets are received from a network by a network interface controller (NIC) of the network device, receive descriptors to the slots in the ring, wherein each receive descriptor corresponds with a memory buffer to store packet data;
network communication circuitry for determining whether the NIC of the network device has received one or more packets;
direct memory access (DMA) circuitry for copying, with DMA and in response to a determination that the NIC has received one or more packets, packet data of the received one or more packets from the NIC to the memory buffers associated with the receive descriptors assigned to the slots in the ring; and
means for copying the receive descriptors from the ring to a NIC receive queue before the determination of whether the NIC has received one or more packets, wherein the ring comprises one or more of receive descriptors, metadata, and transmit descriptors interleaved with each other and the NIC receive queue comprises contiguous receive descriptors.

24. A method for processing packets, comprising:
establishing, by a network device, a ring in a memory of the network device, wherein the ring is defined as a circular buffer to store entries representative of packets;
generating and assigning, by the network device and at a rate that is independent of a rate at which packets are received from a network by a network interface controller (NIC) of the network device, receive descriptors to the slots in the ring, wherein each receive descriptor corresponds with a memory buffer to store packet data;
determining, by the network device, whether the NIC of the network device has received one or more packets;
copying, with direct memory access (DMA) and in response to a determination that the NIC has received one or more packets, packet data of the received one or more packets from the NIC to the memory buffers associated with the receive descriptors assigned to the slots in the ring; and
copying the receive descriptors from the ring to a NIC receive queue before the determination of whether the NIC has received one or more packets, wherein the ring comprises one or more of receive descriptors, metadata, and transmit descriptors interleaved with each other and the NIC receive queue comprises contiguous receive descriptors.

25. The method of claim 24, wherein generating and assigning the receive descriptors to the slots in the ring comprises generating and assigning the receive descriptors with one or more cores of a processor of the network device.

26. The method of claim 24, wherein generating and assigning the receive descriptors to the slots in the ring comprises generating and assigning the receive descriptors with one or more hardware components of the NIC.

\* \* \* \* \*